(12) United States Patent
Yamada et al.

(10) Patent No.: US 11,238,092 B2
(45) Date of Patent: Feb. 1, 2022

(54) IMAGE PROCESSING DEVICE, IMAGE PROCESSING SYSTEM, AND VEHICLE

(71) Applicant: Toyota Jidosha Kabushiki Kaisha, Toyota (JP)

(72) Inventors: Yoshinori Yamada, Nagakute (JP); Masaki Ito, Toyota (JP); Shotaro Inoue, Nissin (JP); Akihiro Muguruma, Nagoya (JP); Michio Ikeda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/555,514

(22) Filed: Aug. 29, 2019

(65) Prior Publication Data

US 2020/0073884 A1    Mar. 5, 2020

(30) Foreign Application Priority Data

Aug. 31, 2018   (JP) .............................. JP2018-163692

(51) Int. Cl.
*G06F 3/048*    (2013.01)
*G06F 16/587*   (2019.01)
(Continued)

(52) U.S. Cl.
CPC ....... *G06F 16/587* (2019.01); *G02B 27/0101* (2013.01); *G06F 16/51* (2019.01); *G06F 16/538* (2019.01); *G02B 2027/014* (2013.01)

(58) Field of Classification Search
CPC ............ G02B 21/01; G02B 2027/0141; G02B 2027/0138; G02B 2027/014; G02B 27/01; G02B 2027/0174; G02B 27/0101; B60K 2370/1529; B60K 2370/166; B60K 2370/177; B60K 2370/175; B60K 2370/736; G06F 16/587; G06F 16/51; G06F 16/538; H04N 21/41422; H04N 21/432; H04N 21/4532
See application file for complete search history.

(56) References Cited

U.S. PATENT DOCUMENTS

2008/0226130 A1* 9/2008 Kansal .................... G06F 16/58
                                                           382/106
2011/0022634 A1* 1/2011 Takata .................. G06F 16/583
                                                           707/776
(Continued)

FOREIGN PATENT DOCUMENTS

CN      104848863 A    8/2015
JP      2002181559 A   6/2002
(Continued)

*Primary Examiner* — Aleksey Olshannikov
(74) *Attorney, Agent, or Firm* — Dinsmore & Shohl LLP

(57) ABSTRACT

There is provided an image processing device including: a first memory; a first processor that is connected to the first memory; and a storage section that stores image data related to a position information-appended image that is appended with position information relating to an imaging location. The first processor searches for one or more items of the image data including the position information within a predetermined range of a current position of a vehicle, and selects a position information-appended image related to image data found by the searching as an image to be displayed in the vehicle.

14 Claims, 13 Drawing Sheets

| CATEGORY / IMAGING PERIOD | SCENERY | PEOPLE | FOOD | OBJECTS |
|---|---|---|---|---|
| RECENT (WITHIN THE PAST YEAR) | B | C | A | C |
| 2 TO 5 YEARS AGO | A | C | B | B |
| 5 TO 10 YEARS AGO | A | B | C | A |
| 10 OR MORE YEARS AGO | B | A | C | A |

RANK  PRIORITY LEVEL
A        ↑
B        |
C

(51) Int. Cl.
*G06F 16/51* (2019.01)
*G02B 27/01* (2006.01)
*G06F 16/538* (2019.01)

(56) References Cited

U.S. PATENT DOCUMENTS

| | | | |
|---|---|---|---|
| 2013/0018579 A1* | 1/2013 | Hamilton, II | G01C 21/3647 |
| | | | 701/436 |
| 2013/0286206 A1 | 10/2013 | Ozaki et al. | |
| 2015/0235398 A1* | 8/2015 | Kim | G06F 3/011 |
| | | | 345/633 |
| 2019/0204093 A1* | 7/2019 | Cantrell | G05D 1/0088 |

FOREIGN PATENT DOCUMENTS

| | | |
|---|---|---|
| JP | 2006-293378 A | 10/2006 |
| JP | 2008-039573 A | 2/2008 |
| JP | 2010-028492 A | 2/2010 |
| JP | 2013231655 A | 11/2013 |
| WO | 2017134876 A1 | 8/2017 |

\* cited by examiner

FIG.7

| CATEGORY / IMAGING PERIOD | SCENERY | PEOPLE | FOOD | OBJECTS |
|---|---|---|---|---|
| RECENT (WITHIN THE PAST YEAR) | B | C | A | C |
| 2 TO 5 YEARS AGO | A | C | B | B |
| 5 TO 10 YEARS AGO | A | B | C | A |
| 10 OR MORE YEARS AGO | B | A | C | A |

RANK | PRIORITY LEVEL
A
B
C

IMAGE PROCESSING DEVICE, IMAGE PROCESSING SYSTEM, AND VEHICLE

CROSS-REFERENCE TO RELATED APPLICATION

This application is based on and claims priority wider 35 USC § 119 from Japanese Patent Application No. 2018-163692 filed on Aug. 31, 2018, the disclosure of which is incorporated by reference herein.

BACKGROUND

Technical Field

The present disclosure relates to an image processing device, an image processing system, and a vehicle that presents images to an occupant of a vehicle.

Related Art

Japanese Patent Application Laid-Open (JP-A) No. 2002-181559 discloses a scenery display device that is capable of displaying scenery in a desired direction at a desired location, that is capable of automatically searching for a location with optimal scenery, that is capable of researching the scenery at a location prior to traveling, to the destination, and that is capable of providing visual scenery guidance for any location in coordination with travel.

Note that in autonomous-driving vehicles, an occupant who is freed up from driving has more freedom in their activities, and may desire something out of the ordinary, such as to view scenes from the past while traveling.

However, in the scenery display device described in JP-A No. 2002-181559, although real scenery can be simulated and displayed, there is no function to display scenes from the past.

SUMMARY

In consideration of the above circumstances, an object of the present disclosure is to provide an image processing device, an image processing system, and a vehicle capable of presenting an occupant with scenes from the past by displaying past images that are relevant to the location of a vehicle while traveling.

An image processing device of a first aspect includes a storage section that stores image data related to a position information-appended image that is appended with position information relating to an imaging location, a search section that searches for one or more items of the image data including the position information within a predetermined range of a current position of a vehicle, and a selection section that selects a position information-appended image related to image data found by the search section, as an image to be displayed in the vehicle.

The "predetermined range" may include a range within a fixed distance from the current position of the vehicle, a route to be taken by the vehicle, or the like. In the image processing device of the first aspect, the position information-appended image configured by an image captured in the past and appended with the position information is stored in the storage section. The image processing device has a function of searching for one or more items of the image data including the position information that fall within the predetermined range of the current position of the vehicle, and displays a position information-appended image related to the found image data in the vehicle. The image processing device of the first aspect displays past images that are relevant to the location of the vehicle during travel, enabling scenes from the past to be presented to an occupant.

In an image processing device of a second aspect, the selection section selects an image to be displayed in the vehicle based on a preference of an occupant of the vehicle.

The image processing device of the second aspect is capable displaying an image in the vehicle that reflects the interests of an occupant.

In an image processing device of a third aspect, the selection section selects an image to be displayed in the vehicle according to an attribute of an occupant onboard the vehicle.

"An attribute of an occupant" refer to characteristics enabling one or plural occupants to be distinguished. For example, in, the image processing device of the third aspect, an individual ID is set as an attribute for each onboard occupant. Moreover, for example, in cases in which a family is onboard, the image processing device sets distinguishing information indicating the family as an attribute, and in cases in which a group of friends is onboard, the image processing device sets distinguishing information indicating the friends as an attribute. The image processing device of the third aspect enables images tailored to the occupant or occupants onboard the vehicle to be displayed.

An image processing device of a fourth aspect further includes a collection section that collects a past image captured in the past, and in a case in which the position information is appended to image data, related to the past image, the storage section stores the past image as a position information-appended image.

The image processing device of the fourth aspect is capable of displaying, a greater variety of images in the vehicle by collecting a position information-appended image from an external source.

In an image processing device of a fifth aspect, the collection section collects a normal image, which is a past image that is not appended with the position information, and the image processing device further includes an information appending section that compares the normal image against the position information-appended image stored in the storage section, and in a case in which the normal image and the position information-appended image stored in the storage section are similar, appends the position information of the similar position information-appended image to the normal image.

The image processing device of the fifth aspect is capable of appending position information even in a case in which a collected image has not been appended with the position information by referencing a previously collected position information-appended image.

In an image processing device of a sixth aspect, the collection section collects a normal image, which is a past image that is not appended with the position information, and the image processing device further includes an acquiring-appending section that compares the normal image against an online image acquired from the Internet, and in a case in which the normal image and the online image acquired from the Internet are similar, acquires the position information corresponding to the similar online image and appends the acquired position information to the normal image.

The image processing device of the sixth aspect is capable of appending position information even in cases in which a collected image has not been appended with the position information by referencing an online image with an identifiable imaging location.

An image processing system of a seventh aspect includes the image processing device of any one of the first aspect to the sixth aspect, and a vehicle including a display device wherein the vehicle includes a reception section that receives the image data selected in the image processing device from the image processing device, and an output section that outputs the image data to the display device in a case in which display in the vehicle of an image related to the image data is permitted.

The image processing system of the seventh aspect is capable of displaying past images when an occupant is freed up from driving, such as when the vehicle is stationary, or during autonomous-driving. This enables occupant safety to be assured.

A vehicle of an eighth aspect includes the image processing device of any one of the first aspect to the sixth aspect, a display device, and an output section that outputs the image data, selected in, the image processing device, to the display device in a case in which display in the vehicle of an image related to the image data is permitted.

The vehicle of the eighth aspect is capable of displaying past images when an occupant is freed up from driving, such as when the vehicle is stationary, or during autonomous-driving. This enables occupant safety to be assured.

The present disclosure is capable of presenting scenes from the past to an occupant by displaying past images that are relevant to the location of a vehicle while traveling.

BRIEF DESCRIPTION OF THE DRAWINGS

Exemplary embodiments of the present disclosure will be described in detail based on the following figures, wherein:

FIG. 7 is a diagram illustrating an example of a preference table according to an exemplary embodiment;

DETAILED DESCRIPTION

Explanation follows regarding an exemplary embodiment of an image processing system of the present disclosure, with reference to the drawings.

Figure 1:
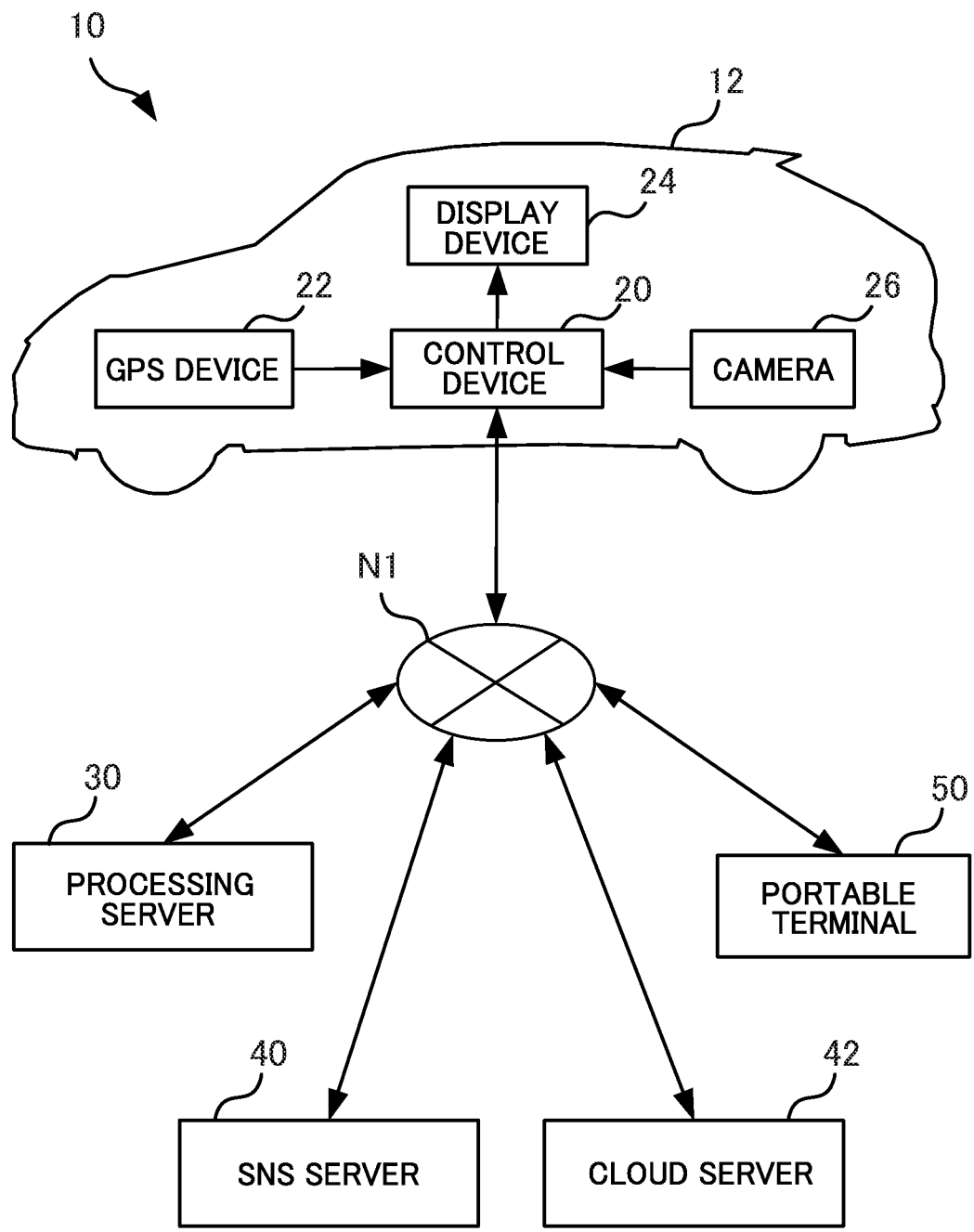
FIG. 1 is a diagram illustrating schematic configuration of an image processing system according to an exemplary embodiment.

FIG. 1 is a block diagram illustrating schematic configuration of an image processing system 10 according to the present exemplary embodiment.

Configuration

As illustrated in FIG. 1, the image processing system 10 according to the present exemplary embodiment includes a vehicle 12 configuring a autonomous-driving vehicle, a processing server 30 configuring an image processing device, a Social Networking Service (SNS) server 40, a cloud server 42, and a portable terminal 50. The vehicle 12 includes a control device 20. The processing server 30, the SNS server 40, the cloud server 42, the portable terminal 50, and the control device 20 are connected together via a network N1.

The SNS server 40 functions as a management server that manages a SNS, Data relating to posts, including images, is stored in the SNS server 40 for individual user accounts. The cloud server 42 functions as an external storage medium for the portable terminal 50. Image data is stored in the cloud server 42 for individual user accounts. Explanation follows regarding an example in which an occupant of the vehicle 12 is a user of the SNS server 40 and the cloud server 42.

The portable terminal 50 is a smartphone or tablet terminal in the possession of the occupant of the vehicle 12 who is using the image processing system 10.

In addition to the control device 20, the vehicle 12 also includes a Global Positioning System (GPS) device 22, a display device 24, and cameras 26.

Figure 2:
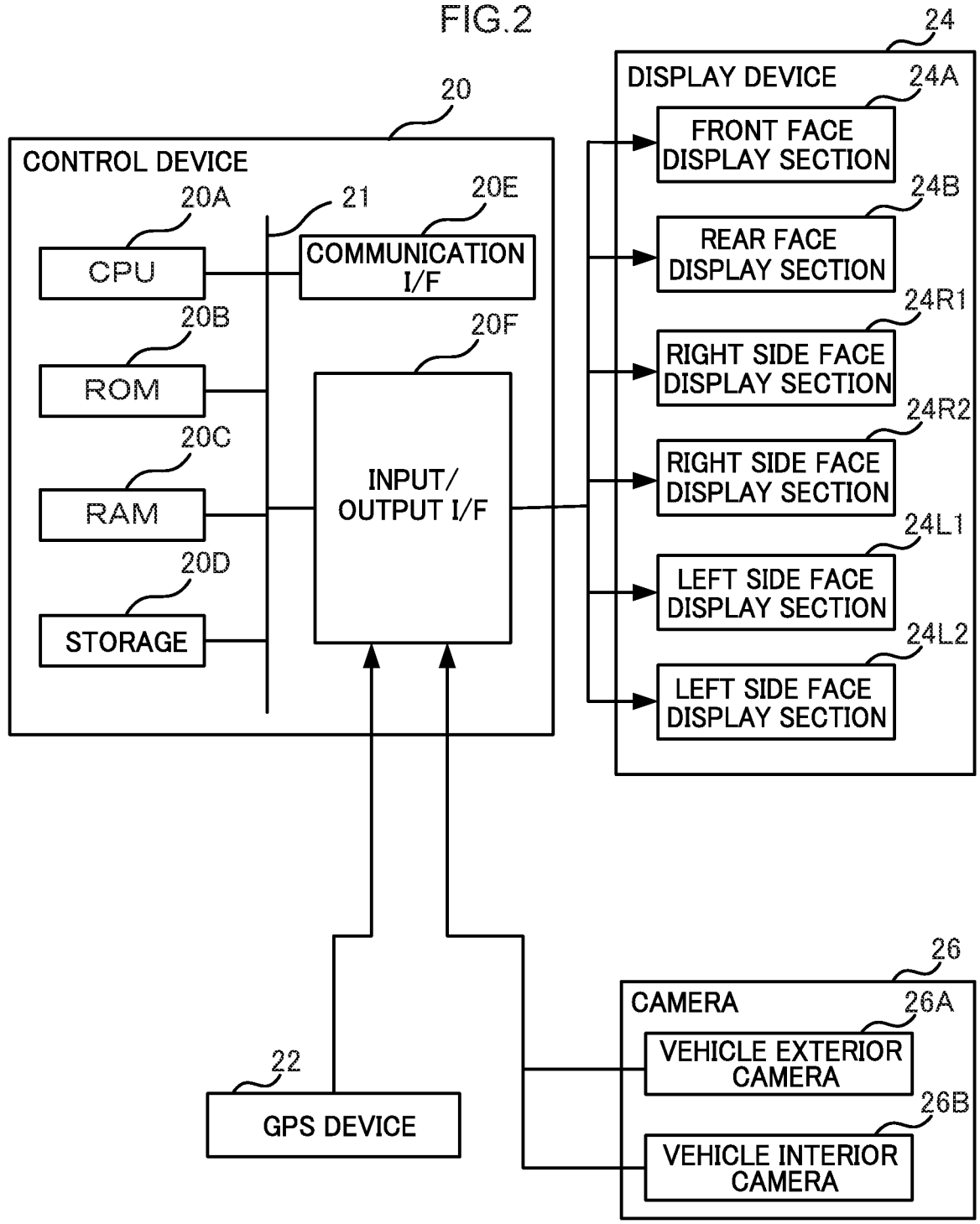
FIG. 2 is a block diagram illustrating hardware configuration of a control device.

FIG. 2 is a block diagram illustrating hardware configuration of equipment mounted to the vehicle 12 of the present exemplary embodiment.

The GPS device 22 is a device that acquires position information of the vehicle 12.

The display device 24 is configured by display units that display past images of past scenery, people, objects, and the like captured in the past. The display device 24 of the present exemplary embodiment is configured by see-through display units provided at windows of the vehicle 12. The display device 24 includes a front face display section 24A provided at a front window, and a rear face display section 24B provided at a rear window. On the vehicle right side, the display device 24 also includes a right side face display section 24R1 provided to a right front side door, and a right side face display section 24R2 provided to a right rear side door, OD the vehicle left side, the display device 24 also includes a left side face display section 24L1 provided to a left front side door, and a left side face display section 24L2 provided to a left rear side door.

Note that the display device 24 may be configured by monitors independently provided inside the vehicle cabin.

The cameras 26 are imaging devices provided at the front of the vehicle 12. The cameras 26 of the present exemplary embodiment include a vehicle exterior camera 26A that doubles as a autonomous-driving sensor, and a vehicle interior camera 26B that images occupants inside the vehicle cabin. Note that another camera separate to a camera employed in autonomous-driving may be provided as the vehicle exterior camera.

The control device 20 is configured including a Central Processing Unit (CPU) 20A, Read Only Memory (ROM) 20B, Random Access Memory (RAM) 20C, storage 20B, a communication interface (I/F) 20E, and an input/output I/F 20F. The CPU 20A, the ROM 20B, the RAM 20C, the storage 20D, the communication I/F 20E, and the input/output I/F 20F are connected so as to be capable of communicating with each other through a bus 21. The CPU 20A corresponds to a second processor, and the RAM 20C corresponds to a second memory.

Figure 3:
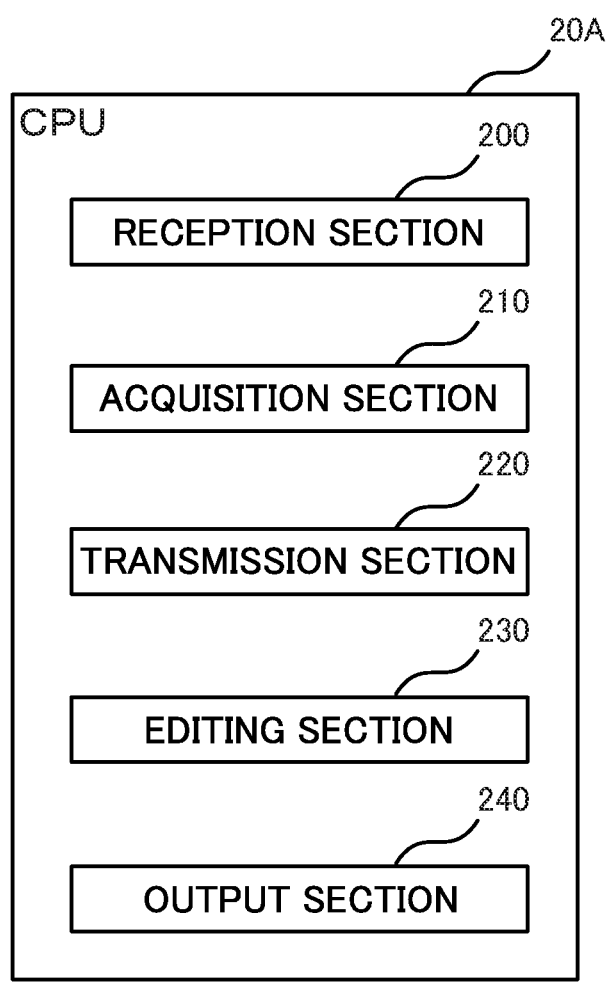
FIG. 3 is a block diagram illustrating an example of functional configuration of a CPU of a control device.

The CPU 20A is a central computation processing unit that executes various programs and controls the respective sections. Namely, the CPU 20A reads a program from the ROM 20B or the storage 20D, and executes the program using the RAM 20C as a workspace. In the present exemplary embodiment, an execution program for executing image display processing, described later, is stored in the storage 20D. By executing the execution program, the CPU 20A functions as a reception section 200, an acquisition section 210, a transmission section 220, an editing section 230, and an output section 240, as illustrated in FIG. 3.

The ROM 20B stores various programs and various data. The RAM 20C acts as a workspace for temporary storage of programs and data. The storage 20D, serving as a storage section, is configured by a Hard Disk Drive (HDD) or a Solid State Drive (SSD), and stores various programs including an operating system, as well as various data.

The communication PT 20E is an interface for communicating with other equipment, such as the processing server 30, and uses a communication standard such as Ethernet (registered trademark), FDDI, or Wi-Fi (registered trademark).

The input/output I/F 20F is an interface for communicating with the various devices mounted to the vehicle 12. The CPS device 22, the display device 24, and the cameras 26 are connected to the control device 20 of the present exemplary embodiment through the input/output I/F 20F. Note that the GPS device 22, the display device 24, and the cameras 26 may be directly connected to the bus 21.

FIG. 3 is a block diagram illustrating an example of functional configuration of the CPU 20A. As illustrated in FIG. 3, the CPU 20A includes the reception section 200, the acquisition section 210, the transmission section 220, the editing section 230, and the output section 240. Each functional configuration is realized by the CPU 20A reading and executing the execution program stored in the storage 20D.

The reception section 200 has a function of receiving image data transmitted from the processing server 30 via the communication I/F 20E. Images related to this image data are not limited to still images, and may include video images.

The acquisition section 210 has a function of acquiring current position information of the vehicle 12 from the GPS device 22. The acquisition section 210 also has a function of acquiring vehicle exterior images captured by the vehicle exterior camera 26A and vehicle interior images captured by the vehicle interior camera 26B.

The transmission section 220 has a function of transmitting, via the communication I/F 20E, position information of the vehicle 12 acquired by the acquisition section 210 and image data relating to images captured by the cameras 26 to the processing server 30. The transmission section 220 also has a function of transmitting occupant information regarding occupants in the vehicle 12 to the processing server 30. Note that the occupant information includes the number of occupants as calculated based on images captured by the vehicle interior camera 26, and, if individual occupants can be identified, information regarding each individual.

The editing section 230 has a function of editing past images to be displayed on the display device 24. In cases in which the reception section 200 has received image data relating to plural past images, the editing section 230 selects past images to be displayed on the respective units of the display device 24, and sets a display sequence.

The output section 240 has a function of outputting a past image related to the image data received by the reception section 200 to the display device 24.

Figure 4:
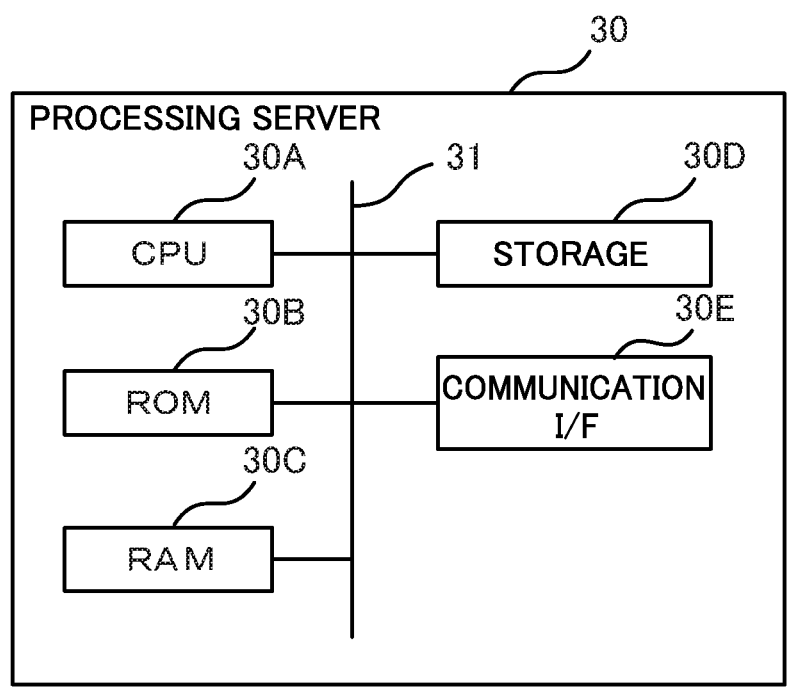
FIG. 4 is a block diagram illustrating hardware configuration of a processing server.

FIG. 4 is a block diagram illustrating hardware configuration of the processing server 30 of the present exemplary embodiment.

As illustrated in FIG. 4, the processing server 30 is configured including a CPU 30A, ROM 30B, RAM 30C, storage 30D, and a communication I/F 30E. The CPU 30A, the ROM 30B, the RAM 30C, the storage 30D, and the communication 30E are connected so as to be capable of communicating with each other through a bus 31. The CPU 30A corresponds to a first processor, and the RAM 30C corresponds to a first memory.

Figure 5:
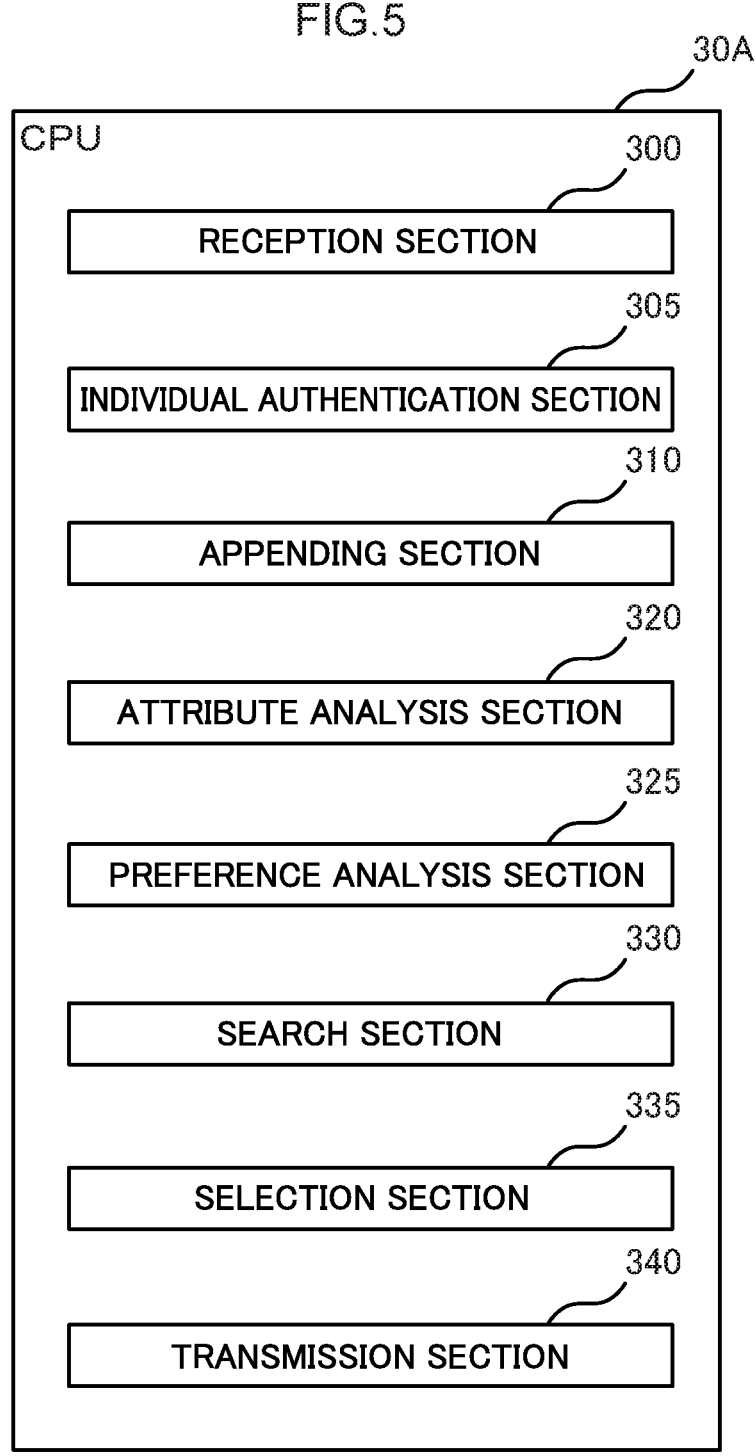
FIG. 5 is a block diagram illustrating an example of functional configuration of a CPU of a processing server.

The CPU 30A is a central computation processing unit that executes various programs and controls the respective sections. Namely, the CPU 30A reads a program from the ROM 30B or the storage 30D, and executes the program using the RAM 30C as a workspace. In the present exemplary embodiment, a control program 350, described later, is stored in the storage 30D. By executing the control program 350, the CPU 30A functions as a reception section 300, an individual authentication section 305, an appending section 310, an attribute analysis section 320, a preference analysis section 325, a search section 330, a selection section 335, and a transmission section 340, as illustrated in FIG. 5.

Figure 6:
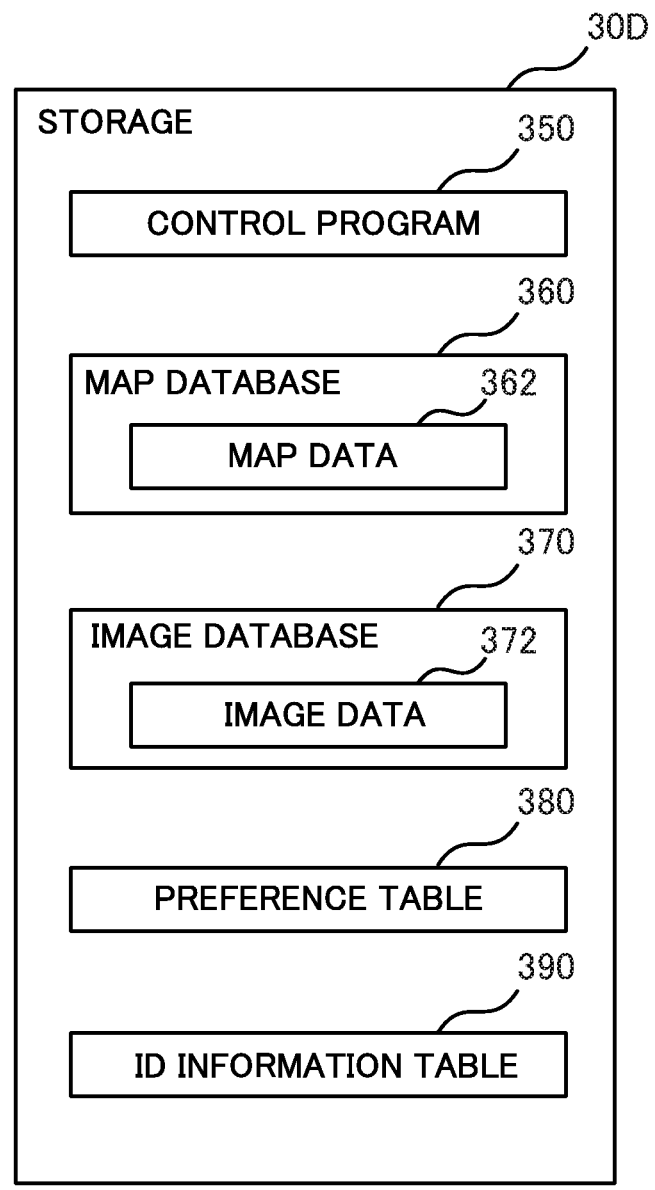
FIG. 6 is a block diagram illustrating an example of data stored in storage of a processing server.

The ROM 30B stores various programs and various data. The RAM 30C acts as a workspace for temporary storage of programs and data. The storage 30D, serving as a storage section, is configured by a Hard Disk Drive (HDD) or a Solid State Drive (SSD), and Stores various programs including an operating system, as well as various data. As illustrated in FIG. 6, the storage 30D of the present exemplary embodiment stores the control program 350, a map database 360, an image database 370, a preference table 380, and an ID information table 390.

The communication I/F 30E is an interface for communicating with other equipment, such as the control device 20, and employs a communication standard such as Ethernet (registered trademark), FDDI, or Wi-Fi (registered trademark).

The control program 350 is a program for controlling the processing server 30.

The map database 360 includes plural map data 362 in regional divisions or road divisions.

The image database 370 includes image data 372 relating to position information-appended images appended with position information relating to the imaging location. In addition to the position information, the imaging time and date, category information, and distinguishing information relating, to occupant attributes is also appended to the image data 372. The position information-appended images of the present exemplary embodiment are images of subjects such as past scenery, people, and objects, and include both still and video images.

The preference table 380 is a table specifying rankings by image category in order to prioritize an imaging period for display, based on the preferences of an occupant of the vehicle 12 who is using the image processing system 10.

FIG. 7 illustrates an example of the preference table 380, Each imaging period of images in the preference table 380 is appended with a rank from A to C. The preference table 380 is set such that a display priority level becomes higher on progression from C to A.

For example, for the image subject category "scenery" in the preference table 380, the display priority level of images from imaging periods of "2 to 5 years ago" and "5 to 10 years ago" is set higher than the priority level of images in other periods. Moreover, for example, for the subject category "people" in the preference table 380, the display priority level is set higher the older the imaging period of an image, as opposed to images from the imaging periods "recent" and "2 to 5 years ago". Moreover, for example, for the subject category "food" in the preference table 380, the display priority level is set higher the more recent the imaging period of an image, as opposed to images from the imaging periods "5 to 10 years ago" and "10 or more years ago". Moreover, for example, for the subject category "objects" in the preference table 380, the older the imaging period of an image the higher the display priority level, such that images from the imaging periods "5 to 10 years ago" and "10 or more years ago" are set with the highest priority level.

The ID information table 390 includes accounts and passwords required to view occupant posts (images) on the SNS server 40, and accounts and passwords required to view occupant images stored in the cloud server 42. A unique terminal ID for identifying the control device 20, a unique terminal ID for identifying the portable terminal 50, and the like are also stored in the ID information table 390.

FIG. 5 is a block diagram illustrating an example of functional configuration of the CPU 30A. As illustrated in FIG. 5, the CPU 30A includes the reception section 300, the individual authentication section 305, the appending section 310, the attribute analysis section 320, the preference analysis section 325, the search section 330, the selection section 335, and the transmission section 340. Each functional configuration is realized by the CPU 30A reading and executing the control program 350 stored in the storage 30D.

The reception section 300 has a function of receiving, via the communication I/F 30E, current position information of the vehicle 12 and images captured by the respective cameras 26 transmitted from the control device 20. The reception section 300 is also capable of receiving images transmitted from the SNS server 40 and the cloud server 42. In the present exemplary embodiment, images captured in the past that are received by the reception section 300 configure past images. The past images collected, by the reception section 300 of the processing server 30 include position information-appended images which are appended with position information, and normal images which are not appended with position information. The reception section 300 of the present exemplary embodiment corresponds to a collection section.

The individual authentication section 305 has a function of connecting to the SNS server 40 and the cloud server 42 using occupant authentication information in order to acquire images relevant to the occupant of the vehicle 12 who is using the image processing system 10. The individual authentication section 305 also has a function of generating a user ID and password to allow the portable terminal 50 in the possession of the occupant to connect to the processing server 30.

The appending section 310 has a function of appending position information in cases in which a past image received by the reception section 300 is a normal image. The appending section 310 corresponds to an information appending section and an acquiring-appending section. Specifically, when acting as an information appending section, the appending section 310 compares a normal image against position information-appended images stored in the image database 370, and when similar appends position information of a similar position information-appended imago to the normal image. When acting as an acquiring-appending section, the appending section 310 compares a normal image against online images acquired from the Internet, and when similar acquires position information corresponding to a similar online image from the Internet and appends this to the normal image. Note that similarity between images refers to cases in which the similarity between a pair of images, determined by characteristics such as colors and shapes, exceeds a predetermined level. When appended with position information, a normal image becomes a position information-appended image. Image data 372 for the position information-appended image is stored in the image database 370.

The attribute analysis section 320 has a function of analyzing occupant attributes in a position information-appended image. Note that "occupant attributes" refer to characteristics enabling one or plural occupants to be distinguished. The attribute analysis section 320 sets, distinguishing information relating to the attributes analyzed in the image data 372 related to the position information-appended image. For example, the attribute analysis section 320 sets a user ID as an attribute for each onboard occupant. Moreover, for example, in cases in which a family is onboard, the attribute analysis section 320 sets distinguishing information indicating the family as an attribute, and in cases in which a group of friends is onboard, the attribute analysis section 320 sets distinguishing information indicating the friends as an attribute.

The preference analysis section 325 has a function of analyzing preferences of an occupant of the vehicle 12 who is using the image processing system 10. The preference analysis section 325 generates the preference table 380 specifying priority levels of images to be displayed on the vehicle 12 based on preference information included in user registered information input by an occupant using the portable terminal 50. The preference analysis section 325 also computes the frequency with which each category of images collected from the SNS server 40 and the cloud server 42 appears, and updates the preference table 380 accordingly.

The search section 330 has a function of searching one or plural items of image data that include position information falling within a predetermined range of the current position of the vehicle 12. Namely, the search section 330 is able to search position information-appended images having imaging locations falling within the predetermined range of the current position of the vehicle 12. Note that "predetermined range" may for example be a range within a fixed distance from the current position of the vehicle, or may be a route to be taken by the vehicle.

The selection section 335 has a function of selecting past images to be displayed on the display device 24 of the vehicle 12 from the position information—appended images searched by the search section 330. The selection section 335 refers to the preference table 380 generated based on the preferences of the occupant of the vehicle 12 when selecting a past image to be displayed on the display device 24. The selection section 335 also selects past images to be displayed on the display device 24 based on the attributes of the occupant onboard the vehicle 12.

The transmission section 340 has a function of transmitting the image data 372 of the past image selected by the selection section 335 to the control device 20 via the communication I/F 30E.

Processing Flow

Figure 8:
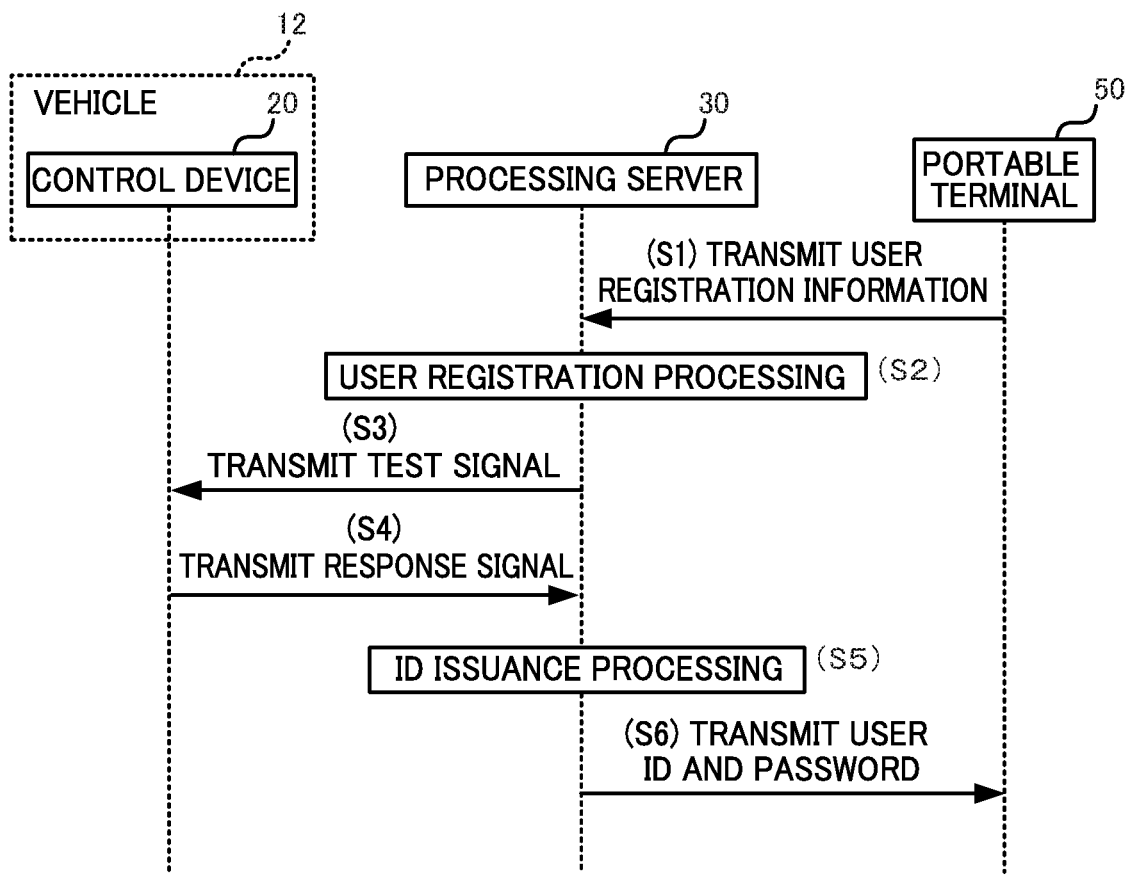
FIG. 8 is a sequence chart illustrating a flow of processing relating to registration in an image processing system according to an exemplary embodiment.

Explanation follows regarding a processing flow of the image processing system 10 of the present exemplary embodiment, with reference to the sequence chart in FIG. 8.

First, explanation follows regarding processing in the processing, server 30 that an occupant of the vehicle 12 who is using the image processing system 10 is required to perform in advance.

At step S1 in FIG. 8, the portable terminal 50 transmits user registration information for the occupant input using the portable terminal 50 to the processing server 30. The user registration information is information input using an input device of the portable terminal 50, and is transmitted to the processing server 30 through an application pre-installed in the portable terminal 50, or through a dedicated internee site. The user registration information includes an account and password required to view occupant posts (images) on the SNS server 40, and an account and password required to view occupant images stored in the cloud server 42. The user registration information also includes information for identifying the control device 20 (such as the unique terminal ID), information for identifying the portable terminal 50 (such as the unique terminal ID), and so on.

Preference information rebating to categories and imaging periods of images to be prioritized for selection for display in the vehicle 12 may also be registered as the user registration information. Note that the registration and amendment of preference information may be performed after user registration.

At step S2, the processing server 30 executes user registration processing based on the user registration information acquired from the portable terminal 50. Specifically, the individual authentication section 305 generates a unique user ID, and writes this generated user ID and the acquired user registration information in a new region of the ID information table 390. The CPU 30A of the processing server 30 generates a preference table 360 based on the preference information.

At step S3, the CPU 30A of the processing server 30 transmits a test signal to the control device 20 corresponding to the unique terminal ID included in the user registration information.

At step S4, the CPU 20A of the control device 20 transmits a response signal to the processing server 30 in cases in which the test signal has been correctly received.

At step S5, the CPU 30A of the processing server 30 executes ID issuance processing in cases in which the response signal has been correctly received. Specifically, the CPU 30A acquires a user ID to be notified to the user, and a password generated at the same as the user ID, from the ID information table 390.

At step S6, the CPU 30A of the processing server 30 transmits the user ID generated in the user registration processing and the password generated at the same time to the portable terminal 50.

The occupant of the vehicle 12 is able to amend settings relating to the image processing system 10 by connecting to the processing server 30 from the portable terminal 50 using the acquired user ID and password. For example, the occupant is able to perform settings relating to activation of functions to display or not display images on the display device 24, and to update preference information. The occupant is also able to set attributes for the position information-appended images. For example, the occupant is able to set their own ID for images in which they appear. Moreover, for example, by defining ranges for family and friends, the occupant is able to set distinguishing information indicating their family in images in which their family appears, and to set distinguishing information indicating their friends in images in which their friends appear.

Figure 9:
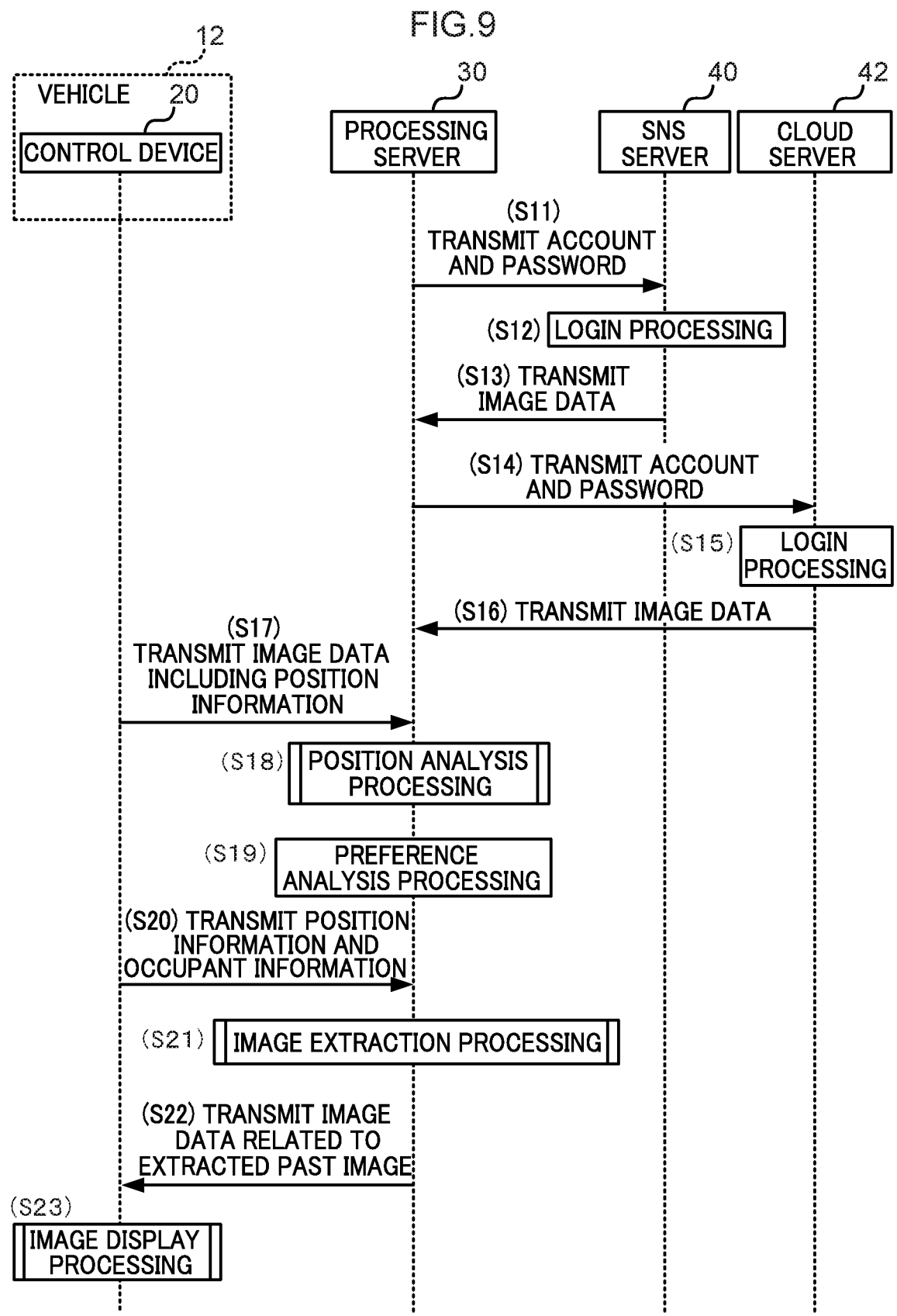
FIG. 9 is a sequence chart illustrating a flow of processing from collection of past images to display of past images in a vehicle in an image processing system according to an exemplary embodiment.

Explanation follows regarding processing, from collection of past images by the processing server 30 to display of a past image by the control device 20, with reference to the sequence chart in FIG. 9.

In step S11 to step S19 in FIG. 9, processing is executed to acquire and accumulate past images to be displayed on the display device 24 of the vehicle 12, and analyze occupant preferences.

First, at step S11, the CPU 30A of the processing server 30 transmits an account and password to the SNS server 40.

At step S12, the SNS server 40 employs the account and password received from the processing server 30 to execute login processing. If the account and password match those in, the SNS server 40, the processing server 30 is able to download posts (images) by the occupant, this being the user.

At step S13, the SNS server 40 transmits image data of images relating to the account of the occupant to the processing server 30. Namely, the CPU 30A receives images included in occupant posts as past images from the SNS server 40. Note that position information, is not necessarily appended to these past images. Namely, the past images may include both position information-appended images and normal images.

At step S14, the CPU 30A of the processing server 30 transmits the account and password to the cloud server 42.

At step S15, the cloud server 42 executes login processing using the account and password received from the processing server 30. If the account and password match those in the cloud server 42, the processing server 30 is able to download images of the occupant, this being the user.

At step S16, the cloud server 42 transmits image data of images relating to the account of the occupant to the processing server 30. Namely, the CPU 30A receives images belonging to the occupant as past images from the cloud server 42. Note that position information is not necessarily appended to these past images. Namely, the past images may include both position information-appended images and normal images.

At step S17, the control device 20 transmits images captured by the cameras 26 in the vehicle 12 to the processing server 30 as image data including position information of imaging locations. Namely, the CPU 30A receives position information-appended images captured in the vehicle 12 as past images.

At step S18, in the processing server 30 that has received the past images, the CPU 30A executes position analysis processing on each image. This processing is explained in detail later. The CPU 30A thereby stores the image data 372 relating to position information-appended images in the image database 370 of the storage 30D.

At step S19, the CPU 30A of the processing server 30 executes preference analysis processing based on the image data 372. In the preference analysis processing, the frequency with, which each category and imaging period appears is determined from the past images which the occupant or the vehicle 1 has captured in the past. The CPU 30A then updates the preference table 380. Note that when executing, the preference analysis processing, the preference information set during user registration at step S1 does not have to be acquired.

Next, at step S20 to step S23, processing is executed to display past images on the display device 24 based on the position information of the vehicle 12.

At step S20, the CPU 20A of the control device 20 transmits current position information of the vehicle 12 acquired from the GPS device 22, and occupant information relating to the onboard occupant acquired by the control device 20, to the processing server 30 at an appropriate timing.

At step S21, in the processing server 30 that has received the position information, the CPU 30A executes image extraction processing based on this position information. This processing is explained in detail later. The CPU 30A thereby extracts a past image to be displayed on the display device 24.

At step S22, the CPU 30A of the processing server 30 transmits image data 372 related to one or plural extracted past images to the control device 20.

At step S23, in the control device 20 that has received the image data 372, the CPU 20A executes image display processing. This processing is explained in detail later. Past images of the vehicle 12 are thereby displayed on the respective units of the display device 24 according to the travel location.

Figure 10:
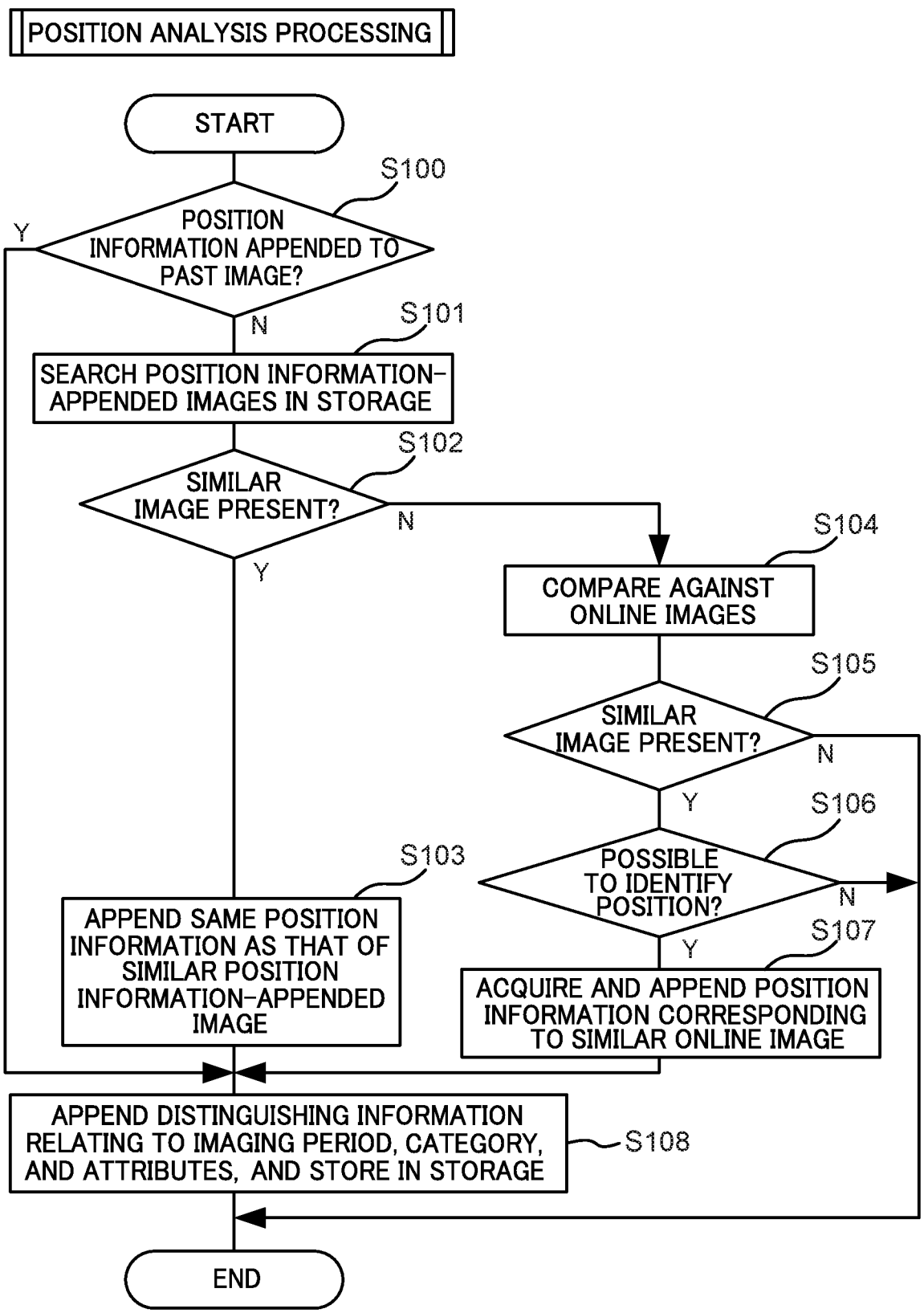
FIG. 10 is a flowchart illustrating an example of a flow of position analysis processing performed by a processing server according to an exemplary embodiment.

Next, explanation follows regarding position analysis processing executed by the CPU 30A of the processing server 30 by reading the control program 350, with reference to FIG. 10.

First, at step S100, the CPU 30A determines whether or not position information is appended to a past image received from the SNS server 40, the cloud server 42, or the vehicle 12. In cases in which the CPU 30A determines that position information is appended to the past image, namely that the past image is a position information-appended image, processing transitions to step S108. However, in cases in which the CPU 30A determines that position information is not appended to the past image, namely that the past image is a normal image, processing transitions to the next step S101.

At step S101, the CPU 30A searches the image data 372 for whether or not the image data 372 includes a position information-appended image that is similar to the normal image. Specifically, the CPU 30A sequentially compares the normal image against position information-appended images in the image data 372, and determines the level of similarity based on characteristics such as colors and shapes in the two images being compared. Processing then transitions to the next step S102.

At step S102, the CPU 30A determines whether or not an image that is similar to the normal image is present amongst the position information-appended images in the image data 372. Namely, the CPU 30A determines whether or not an image is present that has a level of similarity that exceeds a predetermined level. In cases in which the CPU 30A determines that an image that is similar to the normal image is present amongst the position information-appended images in the image data 372, processing transitions to the next step S103. In cases in which the CPU 30A determines there is no image that is similar to the normal image amongst the position information-appended images in the image data 372, processing transitions to step S104.

At step S103, the CPU 30A appends the same position information as that of the similar position information-appended image to the normal image. Processing then transitions to step S108.

At step S104, the CPU 30A searches the Internet for an online image that is similar to the normal image. Specifically, the CPU 30A sequentially compares the normal image against online images, and determines the level of similarity based on characteristics such as colors and shapes in the two images being compared. Processing then transitions to the next step S105.

At step S105, the CPU 30A determines whether or not an image that is similar to the normal image is present amongst the online images on the Internet. Namely, the CPU 30A determines whether or not an image is present that has a level of similarity that exceeds a predetermined level. In cases in which the CPU 30A determines that an image that is similar to the normal image is present amongst the online images on the Internet, processing transitions to the next step S106. In cases in which the CPU 30A determines there is no image that is similar to the normal image amongst the online images on the Internet, the position analysis processing is ended.

At step S106, the CPU 30A determines whether or not the imaging position of the similar online image can be identified. In cases in which the CPU 30A determines that the imaging position of the online image can be identified, processing transitions to the next step S107. However, in cases in which the CPU 30A determines that the imaging position of the online image cannot be identified, the position analysis processing is ended.

At step S107, the CPU 30A acquires position information corresponding to the similar online image from the Internet, and appends the acquired position information to the normal image. The normal image thereby becomes a position information-appended image. Processing then transitions to step S108.

At step S108, the CPU 30A appends the imaging period, the applicable category, and distinguishing information relating to attributes in the image to the position information-appended image, and stores this as image data 372 in the storage 30D. The position analysis processing is then ended.

Figure 11:
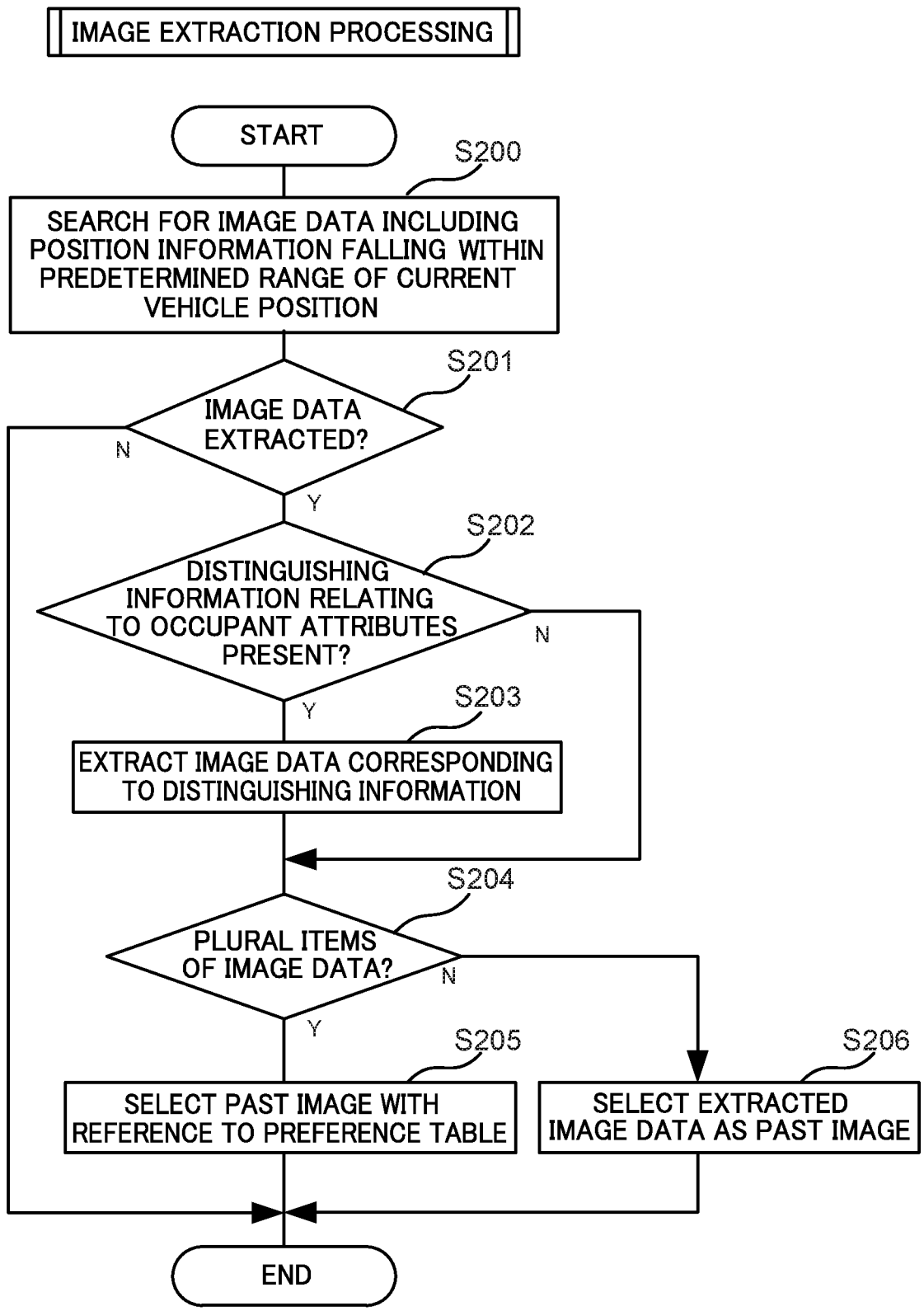
FIG. 11 is a flowchart illustrating an example of a flow of image extraction processing performed by a processing server according to an exemplary embodiment.

Next, explanation follows regarding image extraction processing executed by the CPU 30A of the processing server 30 reading the control program 350, with reference to FIG. 11.

First, at step S200, the CPU 30A searches for whether or not a position information-appended image including position information falling within a predetermined range of the current position of the vehicle 12 is present amongst the image data 372. For example, the CPU 30A searches for whether or not image data 372 is present that includes position information falling within a range with a radius of 500 m centered on the current position information of the vehicle 12. Processing then transitions to the next step S201.

At step S201, the CPU 30A determines whether or not the image data 372 including position information falling within the predetermined range from the current position of the vehicle 12 has been extracted. In cases in which the CPU 30A determines that such image data 372 has been extracted, processing transitions to the next step S202. In cases in which the CPU 30A determines that such image data 372 has not been extracted. The image extraction processing is ended at this point.

At step S202, the CPU 30A determines whether or not the extracted image data 372 includes distinguishing information relating to the attributes of the occupant. In cases in which the CPU 30A determines that such distinguishing information is included, processing transitions to the next step S203. In cases in which the CPU 30A determines that such distinguishing information is not included, processing transitions to step S204.

At step S203, the CPU 30A extracts image data 372 corresponding to the distinguishing information. This for example eliminates past images that are not relevant to the occupant onboard the vehicle 12. Alternatively, in cases in which a family is onboard the vehicle 12, for example, the CPU 30A extracts past images relevant to the family. Processing then transitions to the next step S204.

At step S204, the CPU 30A determines whether or not plural items of image data 372 have been extracted, in cases in which the CPU 30A determines that plural items of image data 372 are present, processing transitions to the next step S205. In cases in which the CPU 30A determines that plural items of image data 372 have not been extracted, namely that only one item of image data 372 is present, processing transitions to step S206.

At step S205, the CPU 30A refers to the preference table 380 to select a past image to be displayed on the display device 24 of the vehicle 12 from out of the position information-appended images related to the extracted image data 372. For example, if extracted position information-appended images categorized as "scenery" from plural imaging periods are present, as illustrated in FIG. 7, selection of position information-appended images from "2 to 5 years ago" and "5 to 10 years ago" is prioritized. Alternatively, for example, if position information-appended images in the "recent" imaging period have been extracted from the "scenery", "people", and "food" categories respectively, as illustrated in FIG. 7, selection of position information-appended images in the "food" category is prioritized. When a past image has been selected, the image extraction processing is ended.

At step S206, the CPU 30A selects a position in image related to the single item of extracted image data 372 as a past image to be displayed on the display device 24 of the vehicle 12. The image extraction processing is then ended.

In, the above image extraction processing, the CPU 30A extracts a past image to be displayed on the display device 24 based on the current position information of the vehicle 12, and the attributes and preferences of the occupant.

Figure 12:
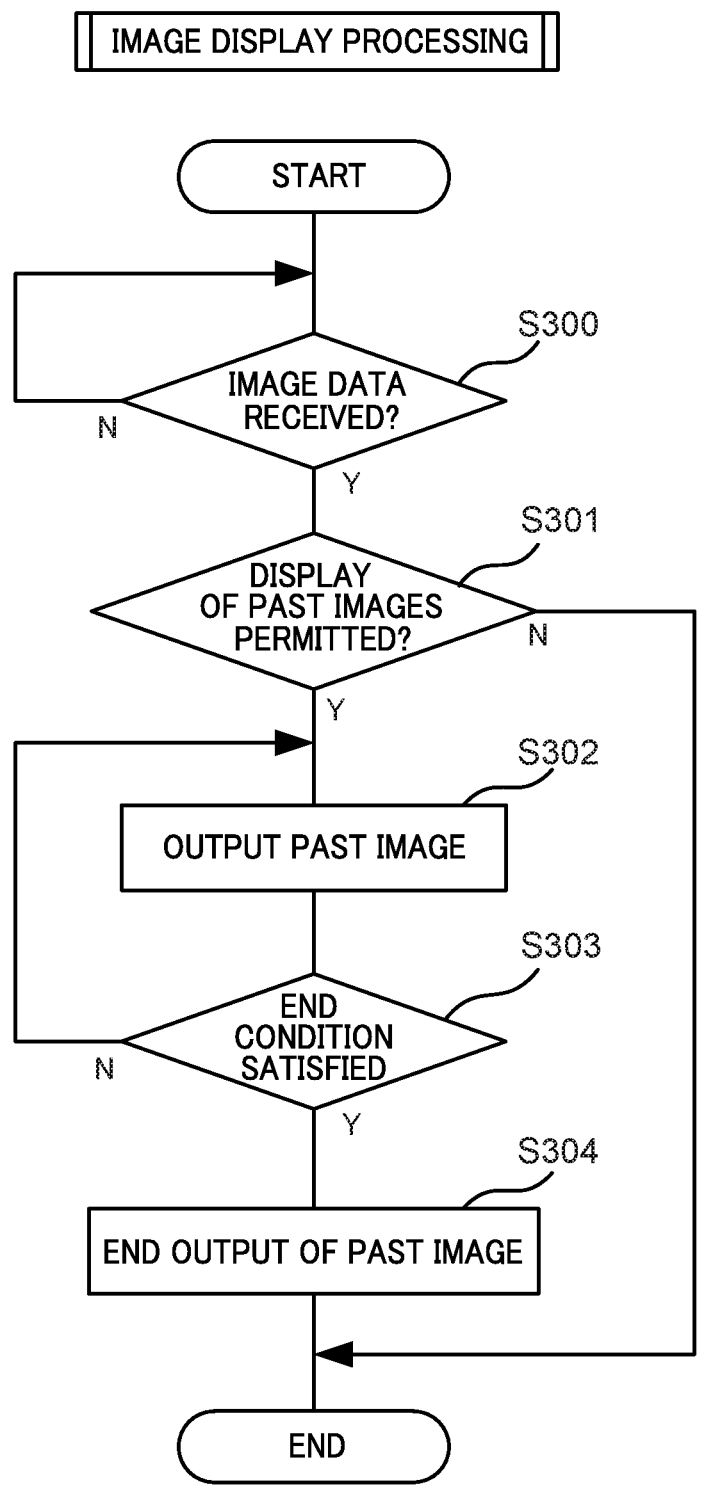
FIG. 12 is a flowchart illustrating an example of a flow of image display processing performed by a control device according to an exemplary embodiment.

Next, explanation follows regarding image display processing executed by the CPU 20A of the control device 20 reading the execution program, with reference to FIG. 12.

First, at step S300, the CPU 20A determines whether or not image data 372 has been received from the processing server 30. When the CPU 20A determines that image data 372 has been received front the processing server 30, processing transitions to the next step S301. When the CPU 20A determines that image data 372 has not been received from the processing server 30, the processing of step S300 is repeated.

At step S301, the CPU 20A determines whether or not display on the display device 24 of past images related to the image data 372 is permitted. Cases in which "display is permitted" are states in which the occupant is freed up from driving, such as when the vehicle 12 is stationary, or during autonomous-driving. In cases in which the CPU 20A determines that display of past images is permitted, processing transitions to the next step S302. In cases in which the CPU 20A determines that display of past images is not permitted, the image display processing is ended at this point.

At step S302, the CPU 20A displays a past image related to the image data 372 on the display device 24. Note that in cases in which there are plural past images to be displayed, different past images may be displayed on the respective units of the display device 24, or the past images may be displayed as a slide show on all of the units of the display device 24. Processing then transitions to the next step S303.

At step S303, the CPU 20A determines whether, or not an end condition has been satisfied. "End conditions" include cases in which the vehicle 12 has passed beyond the imaging location relating to the past image being displayed, and cases in which a predetermined duration has elapsed since starting display of the past image on the display device 24. In cases in which the CPU 20A determines that an end condition has been satisfied, processing transitions to the next step S304. In cases in which the CPU 20A determines that the end conditions have not been satisfied, processing returns to step S302. Namely, display of the past image on the display device 24 continues.

At step S304, the CPU 20A ends the display of the past image on the display device 24. The image display processing is then ended.

SUMMARY

In the image processing system 10 of the present exemplary embodiment, a past image relevant to a travel location of the vehicle 12 is displayed on the display device 24 during travel, thereby enabling, a past scene to be presented to the occupant.

Note that in the processing server 30 of the present exemplary embodiment, providing the preference table 380 based on the preferences of the occupant onboard the vehicle 12 enables a past image that reflects the interests of the occupant to be displayed in the vehicle 12. The preference table 380 may be generated based on preference information transmitted by the occupant using the portable terminal 50, or may be generated based on tendencies in past images collected from the SNS server 40 and the cloud server 42. The preference table 380 may also be updated based on update instructions given by the occupant using the portable terminal 50.

In the present exemplary embodiment, appending distinguishing information relating to the attributes of the occupant to the position information-appended images stored in the processing server 30 enables a past image that is tailored to the occupant onboard the vehicle to be displayed. This distinguishing information may be appended by the occupant using the portable terminal 50. Alternatively, this distinguishing information may be appended with reference to position information-appended images stored as image data 372. For example, the same distinguishing information may be appended to position information-appended images in which the same person appears. The distinguishing information may be amended at a later time by the occupant using the portable terminal 50.

The processing server 30 of the present exemplary embodiment has a function of collecting past images to be displayed in the vehicle 12 from the control device 20, the SNS server 40, and the cloud server 42. This enables a greater variety of past images to be displayed in the vehicle 12.

In the present exemplary embodiment, even in cases in which a collected past image is a normal image that is not appended with position information, position information can be appended at a later time. For example, a normal image can be compared against position information appended images already stored in the processing server 30 one after another, and position information of a similar position information-appended image can be appended to the normal image in cases in which a pair of images are similar to each other. Alternatively, for example, a normal image can be compared against online images on the Internet one after another, and position information corresponding to a similar online image can be appended to the normal image in cases in which a pair of images are similar to each other. In the present exemplary embodiment, past images to be displayed in the vehicle 12 may include not only digital photographs captured by a digital camera or the like, but also photographs on film, posters, and the like. This enables old images to also be displayed in the vehicle 12, allowing the occupant to feel a greater sense of nostalgia for the past.

In the vehicle 12 of the present exemplary embodiment, in cases in which display of past images related to the received image data is permitted, a past image is displayed on the display device 24. Note that setting display permission conditions to cases in which the occupant is freed up from driving, such as when the vehicle 12 is stationary or during autonomous-driving, enables the safety of the occupant to be assured. The present exemplary embodiment is also capable of providing a new way of passing the time inside a vehicle for an occupant who is freed up from driving.

Other Exemplary Embodiments

Figure 13:
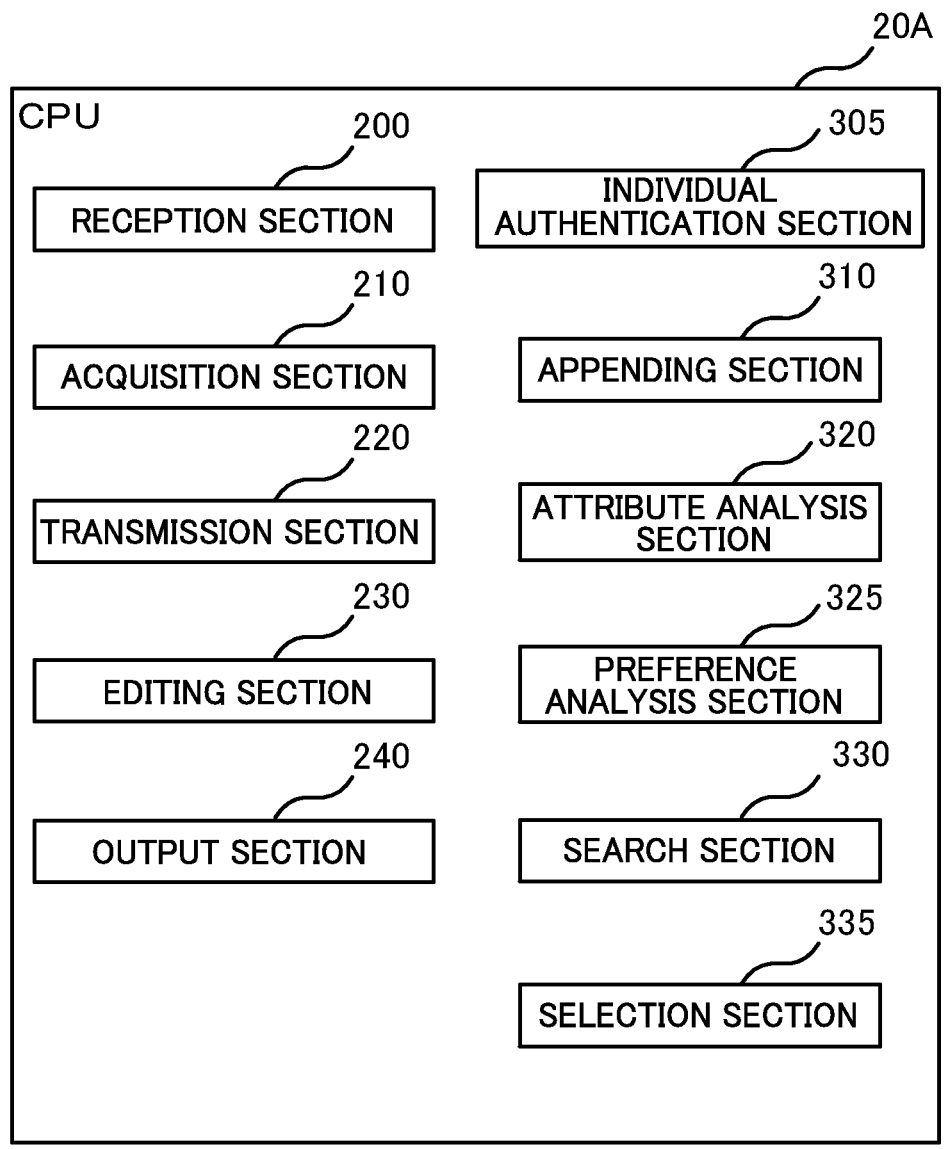
FIG. 13 is a block diagram illustrating an example of functional configuration of a CPU of a control device of another exemplary embodiment.

In the image processing system 10 of the above exemplary embodiment, the processing server 30 performs position analysis processing of collected past images, preference analysis processing relating to occupant preferences, and image extraction processing based on the position information of the vehicle 12, while the control device 20 executes image display processing of past images. However, there is no limitation thereto. In another exemplary embodiment, all the processing, namely the position analysis processing, the preference analysis processing, the image extraction processing, and the image display processing, may be executed by the control device 20. In such cases, the processing server 30 is not required, and the control device 20 serves as the image processing device. In this other exemplary embodiment, the CPU 20A of the control device 20 executes the execution program so as to function as the individual authentication section 305, the appending section 310, the attribute analysis section 320, the preference analysis section 325, the search section 330, and the selection section 335, in addition to the reception section 200, the acquisition section 210, the transmission section 220, the editing section 230, and the output section 240 (see FIG. 13). The reference numerals and functions in this other exemplary embodiments are the same as those described previously. In this other exemplary embodiment, the CPU 20A corresponds to a first processor, and the RAM 20C corresponds to a first memory.

Supplement

Note that the position analysis processing, the preference analysis processing, the image extraction processing, and the image display processing that is executed by the CPU 20A, 30A reading software (programs) in the above exemplary embodiment may be executed by various processors other than a CPU. Examples of such processors include a Programmable. Logic Device (PLD) in which circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). The position analysis processing, the preference analysis processing, the image extraction processing, and the image display processing may be executed by a single one of such processors, or may be executed by a combination of two or more processors of the same type or different types (for example, by plural FPGAs, or a combination of a CPU and an FPGA). More specific examples of hardware structures of such processors include electric circuits configured by combining circuit elements such as semiconductor devices.

Moreover, in the above exemplary embodiment, the execution program is pre-stored (installed) in the storage 20D, and the control program 350 is pre-stored (installed) in the storage 30D. However, configuration is not limited thereto. The various programs may be provided in a format recorded on a recording medium such as a Compact Disc Read Only Memory (CD-ROM), a Digital Versatile Disc Read Only Memory (DVD-ROM), or Universal Serial Bus (USB) memory. The programs may alternatively be provided in a format that can be downloaded from an external device through a network.

The processing flows described in the above exemplary embodiment are merely examples thereof, and unnecessary steps may be omitted, new steps added, or the processing sequence changed within a range not departing from the spirit thereof.

Furthermore, the respective configurations of the control device, the processing server, the SNS server, the cloud server, and the portable terminal described in the above exemplary embodiment are merely examples, and may be changed according to circumstances within a range not departing from the spirit thereof.

What is claimed is:

1. An image processing device comprising:

a first memory;

a first processor that is connected to the first memory; and a storage section that stores image data related to a position information-appended image that is appended with position information relating to an imaging location, wherein the first processor:

searches for one or more items of the image data stored in the storage section including the position information within a predetermined range of a current position of a vehicle, the predetermined range is a fixed distance from the current position of the vehicle irrespective of vehicle velocity, determines that a plurality of items of image data including the position information within the predetermined range of the current position of the vehicle can be extracted based on the search, determines a category of the plurality of items of image data, wherein the category is defined by a plurality of imaging periods each having a priority level based on a preference of an occupant of the vehicle, and selects a position information-appended image from the plurality of items of image data within the imaging period having a highest priority level as an image to be displayed in the vehicle.

2. The image processing device of claim 1, wherein the first processor selects an image to be displayed in the vehicle based on a preference of an occupant of the vehicle.

3. The image processing device of claim 1, wherein the first processor selects an image to be displayed in the vehicle according to an attribute of an occupant onboard the vehicle.

4. The image processing device of claim 1, wherein:

the first processor collects a past image captured in the past via a reception section;

in a case in which the position information is appended to image data related to the past image, the storage section stores the past image as a position information-appended image; and the first processor displays an image relevant to the current location of the vehicle on a display device during travel thereby enabling a past scene to be presented to an occupant of the vehicle.

5. The image processing device of claim 4, wherein:

the first processor collects a normal image, which is collected via the reception section and is a past image that is not appended with the position information, compares the normal image against the position information-appended image stored in the storage section, and in a case in which the normal image and the position information-appended image stored in the storage section are similar, appends the position information of the similar position information-appended image to the normal image.

6. The image processing device of claim 4, wherein:

the first processor collects a normal image, which is collected via the reception section and is a past image that is not appended with the position information, compares the normal image against an online image acquired from the Internet, and in a case in which the normal image and the online image acquired from the Internet are similar, acquires the position information corresponding to the online image and appends the acquired position information to the normal image.

7. An image processing system comprising the image processing device of claim 1 and a vehicle including a display device, wherein:

the vehicle includes
a second memory, and
a second processor connected to the second memory; and the second processor:
receives the image data selected in the image processing device from the image processing device, and
outputs the image data to the display device in a case in which display in the vehicle of an image related to the image data is permitted.

8. The image processing system of claim 7, wherein the second processor ends output of the image data in a case in which the vehicle has passed beyond the imaging location.

9. The image processing system of claim 7, wherein the display device is a see-through display unit provided at a window of the vehicle.

10. A vehicle comprising:
the image processing device of claim 1; and
a display device, wherein:
the first processor outputs the image data selected in the image processing device to the display device in a case in which display in the vehicle of an image related to the image data is permitted.

11. The vehicle of claim 10, wherein the first processor ends output of the image data in a case in which the vehicle has passed beyond the imaging location.

12. The vehicle of claim 10, wherein the display device is a see-through display unit provided at a window of the vehicle.

13. The image processing device of claim 1, wherein the first processor further searches for and selects the position information-appended image to be displayed in the vehicle based on the display priority level, wherein the display priority level changes according to the imaging period.

14. The image processing device of claim 13, wherein the display priority level of an image for an intermediate period between a recent image and an image before a predetermined period is higher than the display priority level of the recent image or the image before the predetermined period.

* * * * *